(12) United States Patent
Clancy et al.

(10) Patent No.: US 7,072,356 B1
(45) Date of Patent: Jul. 4, 2006

(54) SYSTEM AND METHOD FOR CONFIGURING A COMMUNICATIONS PROTOCOL

(75) Inventors: T. Terry Clancy, Concord, NH (US); Daniel L Greene, Merrimack, NH (US); Stephen G Tarry, Auburn, NH (US); Vijayakrishna H Kachinthaya, Manchester, NH (US)

(73) Assignee: Cisco Technology, Inc., San Jose, CA (US)

( * ) Notice: Subject to any disclaimer, the term of this patent is extended or adjusted under 35 U.S.C. 154(b) by 848 days.

(21) Appl. No.: 09/596,633

(22) Filed: Jun. 19, 2000

(51) Int. Cl.
H04J 3/22 (2006.01)
H04L 12/28 (2006.01)

(52) U.S. Cl. ............... 370/465; 370/254; 370/264; 370/466

(58) Field of Classification Search ........... 370/254, 370/264, 265, 351, 360, 386, 464–467, 524
See application file for complete search history.

(56) References Cited

U.S. PATENT DOCUMENTS

| 5,062,108 A | 10/1991 | Bales et al. ............... 370/467 |
| 5,311,590 A | 5/1994 | Arnold et al. ............. 370/465 |
| 5,577,105 A * | 11/1996 | Baum et al. ............ 379/93.05 |
| 5,864,559 A * | 1/1999 | Jou et al. ................. 370/465 |
| 5,946,634 A * | 8/1999 | Korpela ................. 455/552.1 |
| 6,002,689 A | 12/1999 | Christie et al. ............ 370/401 |
| 6,041,052 A * | 3/2000 | Miyake et al. ............ 370/360 |
| 6,222,827 B1 | 4/2001 | Grant et al. ............... 370/254 |
| 6,426,963 B1 * | 7/2002 | Kim ......................... 370/524 |
| 6,453,174 B1 * | 9/2002 | Cunningham et al. ...... 455/560 |
| 6,643,282 B1 | 11/2003 | Christie ..................... 370/352 |
| 6,668,051 B1 | 12/2003 | Ashdown et al. ...... 379/221.08 |
| 2002/0085577 A1* | 7/2002 | Kim ......................... 370/420 |

* cited by examiner

*Primary Examiner*—John Pezzlo
*Assistant Examiner*—Saba Tsegaye
(74) *Attorney, Agent, or Firm*—Baker Botts L.L.P.

(57) ABSTRACT

A system is disclosed that provides a telephony interface device with a modular protocol stack. The interface device downloads protocol modules from a system controller and processes received signals using a core signal handler in combination with the appropriate protocol module for the received signal.

53 Claims, 3 Drawing Sheets

| SPAN | PROTOCOL |
|---|---|
| 1 | NATIONAL ISDN USER |
| 2 | NATIONAL ISDN NETWORK |
| ... | ... |
| N | 4 ESS |

FIG. 4A

| SESSION ID | SPAN/BEARER | STATE |
|---|---|---|
| 214.555.1234 | 1/1 | CONNECTED |
| – | 1/2 | INACTIVE |
| ... | ... | ... |
| 214.555.8444 | 3/5 | CALL PROCEEDING |

| STATE | EVENT | ACTION | NEXT STATE |
|---|---|---|---|
| INACTIVE | SETUP | *SETUP_CALL | SETUP |
| ⋮ | ⋮ | ⋮ | ⋮ |
| CALL PROCEEDING | ALERTING | *RING | CALL PROCEEDING |
| CALL PROCEEDING | CONNECT | *CONNECT_CALL | CONNECTING |
| ⋮ | ⋮ | ⋮ | ⋮ |
| CONNECTED | DISCONNECT | *DISCONNECT_CALL | DISCONNECTING |
| ⋮ | ⋮ | ⋮ | ⋮ |

STATE TABLE

| STATE | NUMBER OF EVENTS | INITIAL EVENT POINTER |
|---|---|---|
| DEFAULT(0) | 2 | |
| U0 NULL(1) | 2 | |
| U1 CALL INITIATED (2) | 3 | |
| U3 OUT CALL PROCEEDING (3) | 4 | |
| ⋮ | | |

94    92

EVENT TABLE

| EVENT ID | NEXT STATE | NUMBER OF FUNCTIONS | INITIAL ACTION POINTER |
|---|---|---|---|
| ⋮ | | | |
| SETUP_IND | CallPresent (7) | 3 | |
| SETUP_REQ | CallInitiated (2) | 2 | |
| CALL_PROC_REQ | OutCallProceeding (3) | 2 | |
| ALERT_REQ | CallDelivered (4) | 2 | |
| ⋮ | | | |

96

ACTION TABLE

| ACTION |
|---|
| ⋮ |
| ValidateMsg(CallProceedingMessageDefinition) |
| SendMessageToHost(CALL PROCEEDING) |
| StartTimer(TIMEOUT T310, T310 DURATION) |
| StopTimer() |
| ValidateMsg(AlertingMessageDefinition) |
| SendMessageToHost(ALERTING) |
| ⋮ |

SYSTEM AND METHOD FOR CONFIGURING A COMMUNICATIONS PROTOCOL

TECHNICAL FIELD OF THE INVENTION

This invention relates generally to telecommunications systems, and more particularly to a system and method for configuring a communications protocol.

BACKGROUND OF THE INVENTION

Telecommunications systems use a variety of different communications protocols to provide telephony services. In particular, integrated services digital network (ISDN) communications may use any number of different protocol variants. A common telephony switch may support all different variations of ISDN signaling using an ISDN protocol stack. The ISDN stack contains information for processing ISDN signals using any appropriate protocol variant.

The widespread use of telecommunications devices in a variety of different environments has led to a proliferation of different ISDN protocol variants. For example, different countries often use different ISDN protocol variants, and companies have developed variants for their own switching platforms. The result is an increasing number of different ISDN variants. As the number of variations grows, so too does the size and complexity of the ISDN stack. As the size and complexity of the ISDN stack grows, the switch running the stack becomes more difficult to maintain and update.

SUMMARY OF THE INVENTION

In accordance with the present invention, a system and method for configuring a telecommunications device and processing signals is provided which substantially eliminates or reduces disadvantages and problems associated with previous systems and methods. In a particular embodiment, the present invention satisfies a need for a switch that dynamically configures a communications protocol stack and processes signals using this dynamically configured stack.

According to one embodiment of the present invention, a configurable telecommunications system includes a system controller and an interface device having a plurality of telephony resources. The interface device identifies a protocol module required to process signals received by one of the resources, requests the protocol module required to process the signals from the system controller, receives the requested protocol module from the system controller, and stores the requested protocol module in a local protocol database. The system controller maintains a system protocol database storing a plurality of protocol modules, receives the request from the interface device, and communicates the requested protocol module from the system protocol database to the interface device.

In accordance with another embodiment of the present invention, a configurable telecommunications device includes an interface having a plurality of telephony resources, a memory storing a protocol database having a plurality of protocol modules, and a central processing unit (CPU). The CPU, when executing a configuration application, identifies a protocol module required by a resource to process telephony signals, determines whether the protocol module is stored in the protocol database, and requests the protocol module from a remote device if the protocol module is not stored in the protocol database. The CPU also receives the requested protocol module from the remote device and stores the requested protocol module in the protocol database.

According to another embodiment of the present invention, a method for processing an ISDN telephony signal receives the ISDN signal from a telephony resource, determines a signal type for the signal using a core signal handler, accesses resource information associated with the resource to determine a protocol module for processing the signal and a current processing state for the resource, and processes the signal using the protocol module based on the signal type and the processing state.

The invention provides a number of technical advantages. The system provides a method for dynamically configuring and using a communications device with a modular protocol stack. The system maintains a database containing available communications protocols, while individual interface devices maintain only those modules that are currently needed for processing. By maintaining only the necessary protocol modules, the size of the protocol processing stack in each interface device is reduced, resulting in faster processing of communications and signaling.

In addition, the modular arrangement of protocol stacks allows for a simplified process when upgrading specific protocols. An upgraded protocol module may be loaded onto the system protocol database, and then individual interface devices download the upgraded module to update their protocol stacks. This simplifies the upgrade process and allows switches to upgrade individual modules without affecting the operation of other protocol modules on the interface device. This provides a number of advantages including the ability of an interface device to upgrade a specific protocol module while processing other signals with other protocol modules.

Other technical advantages of the present invention will be readily apparent to one skilled in the art from the following figures, descriptions and claims.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
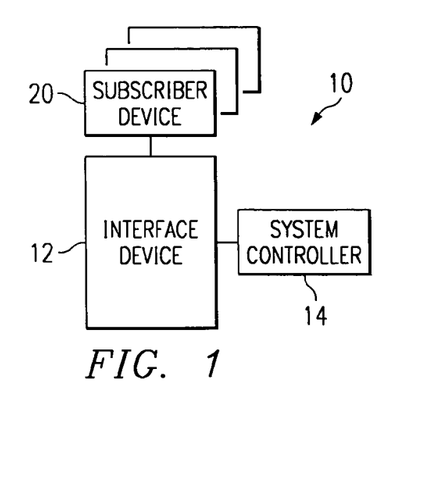
FIG. 1 is a block diagram illustrating a switching system supporting configurable protocol stacks in accordance with the teachings of the present invention.

FIG. 1 illustrates a telecommunications system, indicated generally at 10, that includes an interface device 12 controlled by a system controller 14 and coupled to subscriber devices 20. In general, system 10 configures interface device 12 with signal handling information from system controller 14 and provides for communications and signaling between various devices using interface device 12.

Interface device 12 represents an embedded application, distributed application, or other appropriate application, implemented using software and/or hardware, for establishing connections between multiple attached resources. In a particular embodiment, interface device 12 establishes connections between attached integrated services digital network (ISDN) resources. Subscriber devices 20 represent local and/or remote communications devices coupled to interface device 12 using a suitable communications protocol and link. Interface device 12 may use a wireless or wireline link to communicate voice, data, signaling, video, and/or other information with subscriber devices 20. In general, interface device 12 processes communications using a protocol stack. The stack may include any hardware and/or software for processing signals and communications and performs functions such as signal handling for various protocols.

Subscriber devices 20 may be customer premises equipment (CPE), switches, subscriber gateways or other types of communications devices. In a particular embodiment, subscriber devices 20 connect to interface device 12 using primary rate interface (PRI) ISDN lines and communicate using an ISDN communications protocol. The following description will detail the operation of system 10 using ISDN protocols for telecommunications devices, however, these methods may be applied to other communications media and protocols.

In operation, system controller 14 downloads core signal handling information to interface device 12. Interface device 12 determines which communications protocols are necessary to provide communications and signaling for subscriber devices 20. Interface device 12 then downloads the necessary signal handling protocol modules from system controller 14. Using the core signal handler and the protocol modules, interface device 12 handles communications and signaling with subscriber devices 20 using the appropriate signaling protocols. Signaling typically occurs using dedicated signal paths between subscriber devices 20 and interface device 12, such as an ISDN D channel. Interface device 12 treats each incoming signal path, along with the associated communications path, as a separate resource. Using the core signal handling information, interface device 12 can perform initial processing on a signal received from any of the signal channels.

Then, using an appropriate protocol module, interface device 12 processes the signal according to the specific protocol. Protocol modules, whether described as appropriate, necessary, required, or otherwise, represent any software, tables, data, or other information that interface device 12 may use to process communications and signaling for a selected communications protocol. Although interface device 12 connects to subscriber devices 20, system 10 contemplates interface device 12 connecting to subscriber devices 20 using any appropriate interface and communications protocol. In addition, system controller 14 may control and provide signal handling information to multiple interface devices 12 and other devices in system 10.

Figure 2:
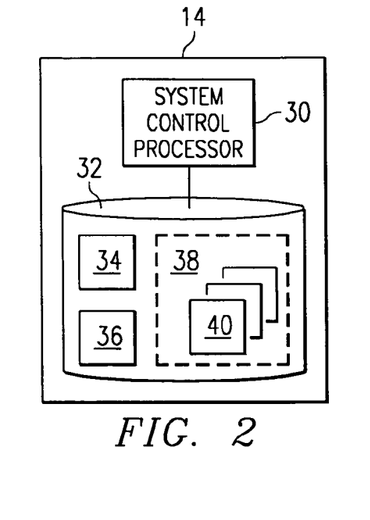
FIG. 2 is a block diagram illustrating an exemplary system controller for the system of FIG. 1.

FIG. 2 illustrates a block diagram of a particular embodiment of system controller 14 including a system control processor 30 and a system memory 32 storing system information. System information includes system control information 34, core signal handling information 36, a system protocol database 38 containing protocol modules 40, and any other information necessary for controlling the operation of devices in system 10.

System control processor 30 represents any combination or arrangement of hardware and/or software for interfacing with and controlling devices in system 10, including the configuration and operation of interface device 12. System memory 32 represents any one or combination of volatile or non-volatile, local or remote devices suitable for storing data, for example, random access memory (RAM) devices, read-only memory (ROM) devices, magnetic storage devices, optical storage devices, or any other suitable data storage devices. Moreover, interface device 12 may maintain the functionality of system control processor 30 locally.

In operation, system control processor 30, using system control information, controls the operation of interface device 12. System control processor 30 downloads a core signal handler to interface device 12 from core signal handling information stored in memory 32. In addition, system control processor 30 may download specific signal handling protocol modules from system protocol database 38 to interface device 12. These protocol modules may be downloaded responsive to a request from interface device 12, or when system control processor 30 detects a condition requiring the downloading of a protocol module to interface device 12. For example, when a protocol module in the system protocol database is updated, system control processor 30 may initiate the downloading of the updated protocol module to interface device 12.

Figure 3:
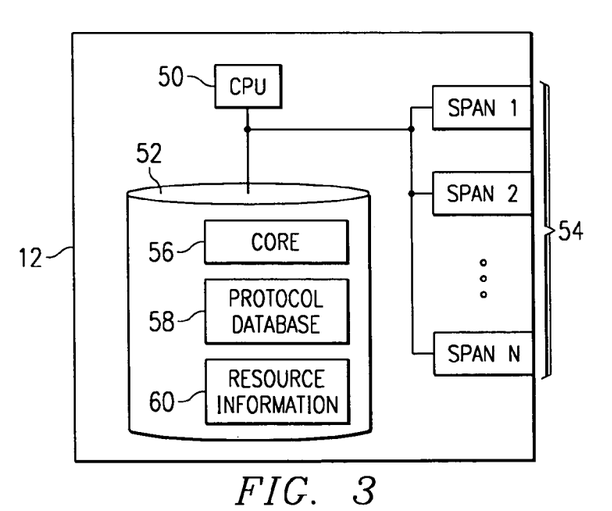
FIG. 3 is a block diagram illustrating an exemplary telecommunications device having a configurable protocol stack.

FIG. 3 is a block diagram illustrating a particular embodiment of interface device 12. Interface device 12 includes a central processing unit (CPU) 50, a memory 52, and spans 54. Spans 54 connect interface device 12 to subscriber devices 20 and provide an interface for communications and signaling. Each span 54 within interface device 12 may provide multiple physical connections, or bearers, for interfacing with subscriber devices 20.

Memory 52 represents any one or combination of volatile or non-volatile devices suitable for storing data, for example, RAM devices, ROM devices, magnetic storage devices, optical storage devices, or any other suitable data storage devices. Memory 52 stores core software 56, a local protocol database 58, and resource information 60. CPU 50 connects to interface device 12, and memory 52, and control the operation of interface device 12 and its functional units.

Each of the functional units within interface device 12 may be implemented using any suitable combination and arrangement of hardware and/or software, and any of the functionality described may be implemented by a computer program stored on a computer readable medium. Core software 56 may include any software necessary for the management and control of interface device 12 and includes a core signal handler. The core signal handler provides signal handling capabilities common to multiple communications protocols. For example, the core signal handler may process all signals received by interface device 12 by determining an appropriate protocol module for handling each signal.

Protocol database 58 represents a collection of information for handling specific communications protocols. In a particular embodiment, protocol database 58 includes a set of protocol modules, with each module directed to processing signals for a specific communications protocol. Each module in protocol database 58 may be separately accessed, removed, added, updated, or otherwise modified without affecting other modules in the database. This allows individual protocol modules to be updated while other modules are in use, providing a live upgrade capability. According to one embodiment, each protocol module contains a state table, which indicates an action to take given a specific signal from a resource in a given state. For example, the state table may indicate a function to perform when a resource in a coupled state receives a disconnect signal. The functions indicated by the state table may be contained in the protocol module, the core software, other software modules, and/or in hardware. Thus, core software 56 provides basic signal handling functions, while protocol database 58 allows for the performance of specific functions based on the signal received and the signaling protocol used.

Resource information 60 represents a collection of information describing the characteristics of the physical interfaces of interface device 12. For each resource, or group of resources, this information indicates a signaling protocol for processing signals. The signaling protocol indicated might be dictated by the type of resource, the type of subscriber device 20 coupled to the resource, or any other appropriate criteria. For example, resource information 60 may, for each span 54, indicate a protocol module for processing signals. In addition, for each resource capable of maintaining an individual communication session, resource information 60 indicates a current processing state. For example, if each span 54 contains multiple bearers, each capable of maintaining a separate communication session, resource information 60 indicates a current state for each of the bearers in interface device 12. This state, in conjunction with the signals received, allows interface device 12 to access a protocol module to determine what actions to take. Examples of states include inactive, unavailable, connected, and other appropriate indicators of the current condition or operation of a telephony resource. Resource information 60 may be determined by interface device 12, configured by system controller 14, configured by other devices in system 10, and/or configured by a user of system 10.

In operation, interface device 12 receives some or all of core software 56 from system controller 14. CPU 50 accesses resource information 60 to determine the necessary protocol modules for handling communications and signaling with subscriber devices 20. CPU 50 may choose to download all required protocol modules from system controller 14, or may choose to download only those protocol modules that are not currently stored in protocol database 58. Moreover, CPU 50 may wait until signals are detected from subscriber devices 20, determine a protocol module for handling the signals, and then download the appropriate protocol module from system controller 14 for storage in protocol database 58.

When interface device 12 receives a signal using span 54, CPU 50 initially processes the signal using the core signal handling functionality of core software 56 and accesses resource information 60 to determine an appropriate protocol module for processing the signal. Using the initial processing information determined using the core signal handler, CPU 50 then processes the signal using the appropriate protocol module from protocol database 58. For example, core software 56 may determine the event being signaled based on a signal type and determine the necessary protocol module based on the resource that received the signal. Then, based on the event and the state of the resource, the core signal handler accesses the protocol module from protocol database 58 and determines the appropriate response.

Figure 4A:
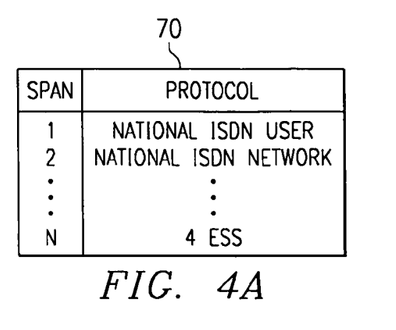
FIGS. 4A and 4B are exemplary resource information tables as maintained by the telecommunications device.
Figure 4B:
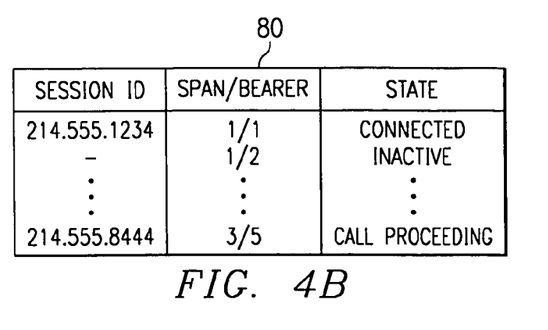

FIGS. 4A and 4B illustrate exemplary tables for storing resource information 60 maintained by CPU 50. FIG. 4A is an exemplary resource protocol table 70 storing information indicating the required protocol for each of span 54 in interface device 12. Resource protocol table 70 allows CPU 50 to determine the appropriate protocol for handling signals from physical resources coupled to interface device 12. For each span 54, the listed protocol indicates a protocol module from protocol database 58 that may be used to process signals. For example, signals received using span #1 of interface device 12 will be processed using a National ISDN User protocol module. The protocol indicated for each span may be any appropriate network protocol, such as National ISDN User, National ISDN Network, European ISDN network standard DSS-1, a custom ISDN protocol such as AT&T's 4ESS ISDN protocol, or any other appropriate signaling protocol. While these examples focus on ISDN protocols, system 10 contemplates interface device 12 operating to handle signals using any appropriate wireless or wireline telephony signaling protocol. In addition, resource information 60 may indicate a required protocol for any individual resource or group of resources in interface device 12. For example, instead of indicating a required protocol for each span 54, resource protocol table 70 could indicate a required protocol for each individual bearer within spans 54.

FIG. 4B illustrates an exemplary resource state table 80 storing information describing the current state of different physical resources in interface device 12. For communications sessions taking place using interface device 12, resource state table 80 tracks a session identifier, an indication of the physical resource (span/bearer), and a current processing state. In addition, resource state table 80 may track other necessary information for processing communications and signaling for active and inactive resources in interface device 12. This example uses telephone numbers to identify each session, however, interface device 12 may use any method for uniquely identifying the states of resources and communications sessions using these resources. Also, while this example illustrates two simplified tables, system 10 contemplates using any data storage technique appropriate for storing resource information 60.

Figure 5:
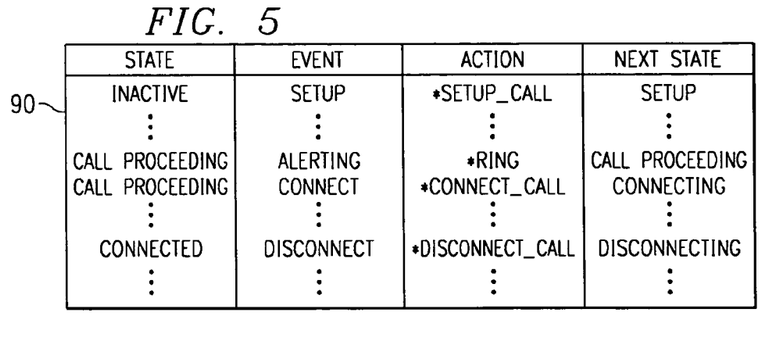
FIG. 5 is an exemplary state table for a protocol module maintained by the telecommunications device.

FIG. 5 illustrates an exemplary protocol module stored as a protocol state table 90. Protocol state table 90 is indexed according to a particular event occurring given a resource in a particular state. Given a state and an event, protocol state table 90 indicates the required action and the next state for the resource. For example, if a resource were in an inactive state and received a setup signal, protocol state table 90 indicates that the appropriate action requires the execution of a setup call routine, and the next state for the resource is setup. For any particular state, there may be any number of entries in protocol state table 90 for different events.

For example, FIG. 5 contains two entries for the state of call proceeding corresponding to the two different events of alerting and connect. Each of the events in protocol state table 90 correspond to different signals received from subscriber devices 20 or other events detected by interface device 12. These signals may include telephony signals, such as alerting (the phone is ringing), call proceeding, connect, connect acknowledge, setup, setup acknowledge, suspend, suspend acknowledge, suspend reject, resume, resume acknowledge, resume reject, disconnect, release, release complete, status inquiry, or status. The actions in protocol state table 90 indicate the appropriate routine to perform given a particular state and event. Upon successful completion of the routine, the state of a resource in resource state table 80 is updated to indicate the appropriate state.

For example, subscriber device 20, using a signaling channel connected to span #1, communicates a setup signal to interface device 12. CPU 50 accesses resource protocol table 70 to determine that the signal must be processed using a National ISDN User protocol and accesses resource table 80 to determine that span #1 bearer #2 is in an inactive state. CPU 50, using a core signal handling functionality, determines that the signal received from subscriber device 20 is requesting a call setup. CPU 50 then accesses protocol state table 90 for the National ISDN User protocol to determine the appropriate action for a resource in an inactive state receiving a setup event. After performing the appropriate action, CPU 50 updates the state of the resource to the next state indicated in the protocol state table.

Figure 6:
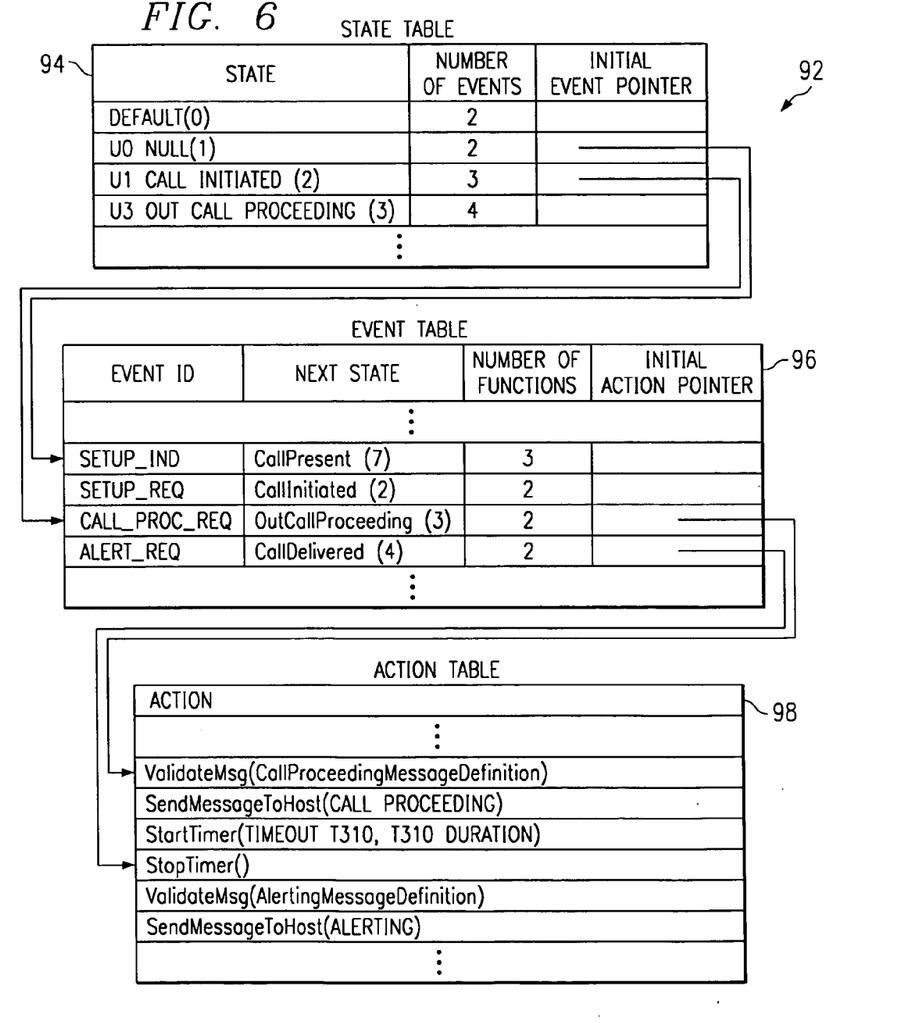
FIG. 6 is an exemplary state transition model for a protocol module maintained by the telecommunications device.

FIG. 6 illustrates an exemplary state transition model, indicated generally at 92, that may serve as a particular embodiment for a protocol module maintained by interface device 12. State transition model 92 includes three portions: a state table 94, an event table 96, and an action table 98. In general, given a resource in a current state indexed in state table 94, interface device 12 performs an action from action table 98 given the occurrence of an event in event table 96.

State table 94 includes fields for states, the number of events associated with each state, and an initial event pointer associated with each state. The number of events field specifies the number of events in event table 96 corresponding to a particular state. The initial event pointer indicates the location of the first event for a particular state in event table 96. Thus, the initial event pointer locates the first valid event for a state in event table 96, and the number of events indicates how many events, beginning with the initial event, are valid for the particular state.

Event table 96 includes events indexed by event identifiers (IDs) and, for each event, contains fields for next state, number of functions, and an initial action pointer. Given the occurrence of an event in event table 96, the initial action pointer indicates the first action in action table 98 to perform, and the number of functions indicates how many functions to perform, beginning with the first function indicated by the initial action pointer. The next state field specifies a function that transitions a resource into the next state after the occurrence of an event. For example, after a SETUP_REQ event is detected for a resource, that resource will be transitioned to a U1_CALL_INITIATED state by the CallInitiated function.

Action table 98 lists the functions executed by interface device 12 when processing events. However, the functions included in this example are provided only to clarify the operation of a specific embodiment of a protocol module. Moreover, while state transition model 92 includes specific tables and fields within these tables, system 10 contemplates using any suitable collection and arrangement of information for maintaining protocol data.

Figure 7:
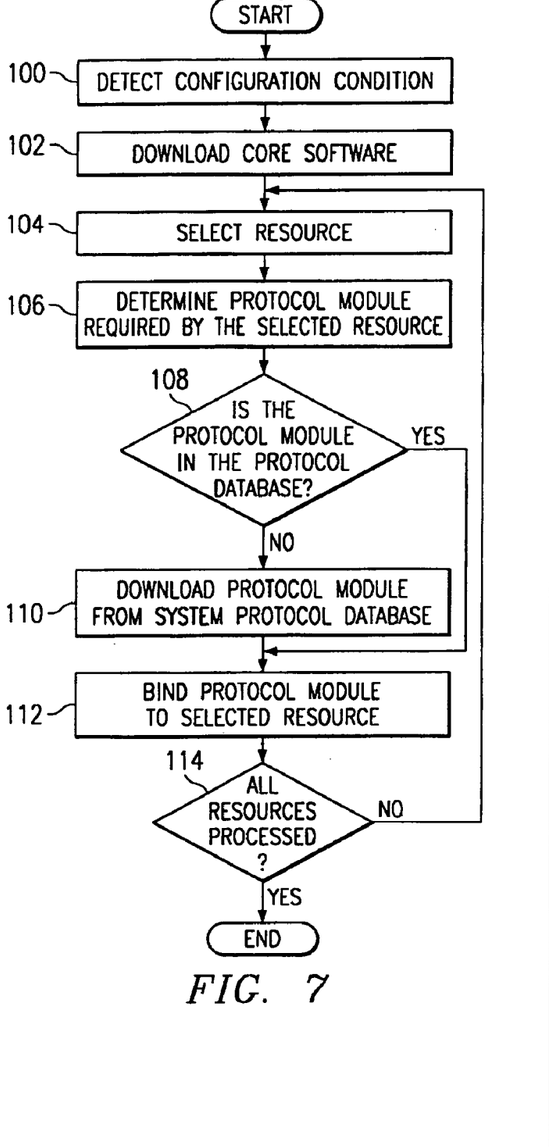
FIG. 7 is a flowchart illustrating a method for configuring the protocol stack of the telecommunications device.

FIG. 7 is a flowchart illustrating a method for configuring a communications device, such as interface device 12. Interface device 12 determines that configuration is required at step 100. The configuration of interface device 12 may take place responsive to a request by a user of system 10, responsive to a command from system controller 14, or responsive to interface device 12 detecting any other circumstances requiring configuration. Interface device 12 downloads core software 56 from system controller 14 at step 102. Interface device 12 selects a resource, such as one of spans 54, at step 104. Interface device 12 accesses resource information 60 to determine the appropriate protocol module for the selected resource at step 106. For example, if span #1 were selected, CPU 50 would access resource protocol table 70 to determine that the selected resource indicates the National ISDN User protocol.

Interface device 12 determines whether the indicated protocol module is in protocol database 58 at step 108. If so, process flows skips to step 112. If the protocol module is not in protocol database 58, interface device 12 downloads the protocol module from system controller 14 and stores the protocol module in protocol database 58 at step 110. Alternatively, interface device 12 may download the protocol module regardless of whether the protocol module is currently stored in protocol database 58. Thus, during configuration, interface device 12 may automatically refresh all current protocol modules stored in protocol database 58 in addition to downloading other necessary protocol modules. This provides flexibility during configuration to upgrade existing modules or quickly configure interface device 12 with only the modules not already stored in the database.

Once the requested protocol module is stored in protocol database 58, interface device 12 binds the protocol module to the selected resource at step 112. This places the selected resource in a position to process signaling using the appropriate protocol module. Interface device 12 then determines whether all resources have been processed at step 114. If not, interface device 12 selects another resource at step 104, looping until the indicated protocol modules for all resources within interface device 12 are stored in protocol database 58. When interface device 12 determines that all resources have been processed, configuration is complete.

Figure 8:
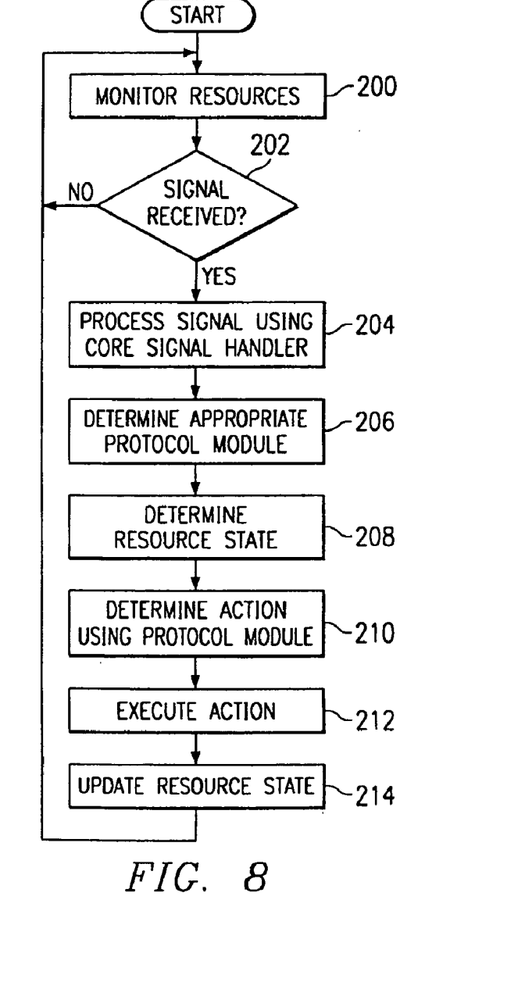
FIG. 8 is a flowchart illustrating a method for processing signals using the configured telecommunications device.

FIG. 8 is a flowchart illustrating a method for processing signals using interface device 12 configured with protocol database 58. This process allows interface device 12 to process signals using a modular protocol stack. Interface device 12 monitors resources at step 200. For example, CPU 50 monitors signaling channels for each bearer within interface device 12. Interface device 12 determines whether a signal has been received at step 202. If not, interface device 12 continues monitoring resources at step 200. If a signal is received, interface device 12 processes the receipt of the signal using a core signal handler at step 204. This may include CPU 50 using core software 56 to determine the type of signal received, such as setup or disconnect. Interface device 12 determines the appropriate protocol module for processing the received signal at step 206. Interface device 12 determines the appropriate protocol module to process the signal using resource information 60, for example, by accessing resource protocol table 70 to determine the protocol indicated for the specific resource.

While this flowchart assumes that all appropriate protocol modules have been previously loaded into protocol database 58, in an alternative embodiment, protocol database 58 may not store all necessary protocol modules for resources within interface device 12. In that case, interface device 12 must download the appropriate protocol module from system controller 14 when it is determined that the protocol module is not in protocol database 58. For example, interface device 12 receives a signal using protocol X and determines that protocol module X is not stored in protocol database 58. At that point, interface device 12 downloads protocol module X from system controller 14. System 10 contemplates interface device 12 downloading appropriate protocol modules at any time before they are used for processing.

Interface device 12 determines the state of the resource that received the signal by accessing resource information 60 at step 208. For example, CPU 50 may access resource state table 80 to determine the current state for a bearer channel in interface device 12 that received the signal. Interface device 12 determines what action to take based on the signal type (event) and the state using the appropriate protocol module at step 210. For example, CPU 50, after determining the appropriate protocol module from resource protocol table 70 and the state of the resource from resource state table 80, accesses protocol state table 90 to determine the appropriate action given the determined state and event. Interface device 12 executes the appropriate action at step 212 and updates the state of the resource at step 214. Interface device 12 continually monitors its resources at step 200 in order to process any signals as soon as they are received. Thus multiple received signals may be concurrently processed according to the preceding method.

The preceding flowcharts illustrate only exemplary methods for configuring interface device 12 with a modular protocol stack and processing signals using the modular protocol stack. System 10 contemplates many of the steps in these flowcharts taking place simultaneously and/or in different orders than as shown in FIGS. 7–8. Furthermore, system 10 contemplates using methods with additional steps, fewer steps, or different steps, so long as the methods remain appropriate for configuring a modular protocol stack within interface device 12 and processing signals using the modular protocol stack.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A configurable telecommunications system, comprising:
    an interface device having a plurality of telephony resources and operable to maintain a local protocol database comprising a plurality of protocol modules, to identify, for each of the telephony resources, a protocol module required to process signals received by the telephony resource, to determine, for each of the identified protocol modules, whether the identified protocol module is valid in the local protocol database, to request each of the protocol modules not determined valid from a system controller, to receive the requested protocol modules from the system controller, to store the requested protocol modules in the local protocol database, and to handle parallel signaling for each of the telephony resources using the protocol module required for that one of the telephony resources; and
    the system controller operable to maintain a system protocol database storing a plurality of master protocol modules, to receive requests from the interface device requesting selected ones of the master protocol modules, and to communicate the requested master protocol modules from the system protocol database to the interface device.

2. The system of claim 1, wherein the local protocol database stores integrated services digital network (ISDN) protocol modules.

3. The system of claim 1, wherein the local protocol database stores a protocol module for each of the telephony resources.

4. The system of claim 1, wherein the protocol module comprises a state table indicating an action based upon a current state and a signal type.

5. The system of claim 1, wherein the interface device maintains resource information indicating a required protocol module for each of the telephony resources and a current state for each of the telephony resources.

6. The system of claim 1, wherein the interface device is further operable to process signals received using a core signal handler in combination with a selected protocol module from the local protocol database.

7. The system of claim 1, wherein the interface device is further operable to accept a new telephony resource, to detect a presence of the new telephony resource, to request a protocol module associated with the new telephony resource from the system controller in response to detecting the presence of the new telephony resource, to receive the requested protocol module associated with the new telephony resource from the system controller, and to store the requested protocol module associated with the new telephony resource in the local protocol database.

8. A configurable telecommunications device, comprising:
    an interface having a plurality of telephony resources;
    a memory storing a protocol database having a plurality of protocol modules; and
    a central processing unit (CPU) operable to:
        identify, for each of the telephony resources, a protocol module required to process telephony signals received by the telephony resource;
        determine, for each of the identified protocol modules, whether the identified protocol module is valid in the protocol database;
        request each of the protocol modules not determined valid from a remote device;
        receive the requested protocol modules from the remote device;
        store the requested protocol modules in the protocol database; and
        to handle parallel signaling for each of the telephony resources using the protocol module required for that one of the telephony resources.

9. The telecommunications device of claim 8, wherein the protocol modules comprise integrated services digital network (ISDN) communications protocols.

10. The telecommunications device of claim 8, wherein each protocol module in the protocol database comprises a state table indicating responses to signals based on a signal type and a current state.

11. The telecommunications device of claim 8, wherein:
    the memory further stores a core signal handler performing functions common for all signals received from the telephony resources; and
    each protocol module in the protocol database operates with the core signal handler to process a specific signaling protocol.

12. The telecommunications device of claim 8, wherein the memory further stores resource information indicating a protocol module required to process signals for each of the telephony resources and a current state for each of the telephony resources.

13. The telecommunications device of claim 8, wherein the controller is further operable to remove an unused protocol module from the protocol database, wherein the unused protocol module is not required by any of the telephony resources.

14. The telecommunications device of claim 8, wherein the controller is further operable to:
- process signals associated with a communication session using a first version of a specific protocol module stored in the protocol database;
- receive an updated version of the specific protocol module during the communication session;
- store the updated version of the specific protocol in the protocol database;
- complete processing of the communication session using the first version of the specific protocol module; and
- remove the first version of the specific protocol module after processing of the communication session is complete.

15. The telecommunications device of claim 8, wherein the CPU is further operable to detect a presence of a new telephony resource, to request a protocol module associated with the new telephony resource from the system controller in response to detecting the presence of the new telephony resource, to receive the requested protocol module associated with the new telephony resource from the system controller, and to store the requested protocol module associated with the new telephony resource in the local protocol database.

16. A method for configuring a telecommunications device, comprising:
- maintaining a local protocol database comprising a plurality of protocol modules;
- identifying, for each of a plurality of telephony resources, a protocol module required to process signals received by the telephony resource;
- determining, for each of the identified protocol modules, whether the identified protocol module is valid in the local protocol database;
- requesting each of the protocol modules not determined valid from a remote protocol database;
- receiving the requested protocol modules;
- storing the requested protocol modules in the local protocol database; and
- handling parallel signaling for each of the telephony resources using the protocol module required for that one of the telephony resources.

17. The method of claim 16, wherein each protocol module comprises a state table indicating responses to integrated services digital network (ISDN) signals.

18. The method of claim 16, wherein each protocol module comprises a state table indicating responses to signals based on a signal type and a current state of the telephony resource associated with the protocol module.

19. The method of claim 16, wherein the local protocol database stores a plurality of protocol modules, each protocol module corresponding to one of the telephony resources.

20. The method of claim 16, further comprising, for each telephony resource, processing signals received by the telephony resource using a core signal handler to access the required protocol based on signal type of a signal received by the telephony resource and a current state of the telephony resource.

21. The method of claim 16, wherein the remote protocol database stores a plurality of master protocol modules that may be requested by the telecommunications device.

22. A communications device for supporting communications using a plurality of integrated services digital network (ISDN) protocols, comprising:
- an ISDN interface having a plurality of resources receiving ISDN signals;
- a memory storing a local protocol database and resource information describing the resources, wherein the local protocol database comprises a plurality of protocol modules; and
- a core signal handler operable to:
  - identify, for each of the resources, a protocol module required to process signals received by the resource;
  - determine, for each of the identified protocol modules, whether the identified protocol module is valid in the local protocol database;
  - request each of the protocol modules not determined valid from a remote protocol database;
  - receive the requested protocol modules from the remote protocol database;
  - store the requested protocol modules in the local protocol database;
  - receive a signal from a selected one of the resources;
  - access the resource information describing the selected one of the resources;
  - determine a protocol module required to process the signal based on the accessed resource information;
  - process the received signal using the required protocol module; and
  - handle parallel signaling for each of the telephony resources using the protocol module required for that one of the telephony resources.

23. The communications device of claim 22, wherein resource information indicates a selected one of the protocol modules required to process ISDN signals for each of the resources.

24. The communications device of claim 22, wherein the protocol modules comprise state tables indicating responses to signals based on signal types and current states of the resources.

25. The communications device of claim 22, wherein the core signal handler is further operable to:
- determine a signal type of the signal;
- determine a current state of the selected one of the resources; and
- access the required protocol module to determine an action based on the signal type and the current state.

26. The communications device of claim 22, wherein the core signal handler is further operable to:
- determine that the required protocol module is not stored in the local protocol database;
- request the required protocol module from the remote protocol database;
- receive the required protocol module from the remote protocol database; and
- store the required protocol module in the local protocol database.

27. A method for processing a telephony signal, comprising:
- maintaining a local protocol database comprising a plurality of protocol modules;
- identifying, for each of a plurality of telephony resources, a protocol module required to process signals received by the telephony resource;
- determining, for each of the identified protocol modules, whether the identified protocol module is valid in the local protocol database;
- requesting each of the protocol modules not determined valid from a remote protocol database;
- receiving the requested protocol modules from the remote protocol database;
- storing the requested protocol modules in the local protocol database;

receiving a signal from one of the telephony resources;
determining a signal type for the signal using a core signal handler;
accessing resource information associated with the one telephony resource to determine a current state of the one telephony resource;
selecting one of the protocol modules for processing the signal;
processing the signal using the selected protocol module based on the signal type and the current state; and
handling parallel signaling for each of the telephony resources using the protocol module required for that one of the telephony resources.

28. The method of claim 27, wherein the signal comprises an integrated services digital network (ISDN) signal.

29. The method of claim 27, wherein the core signal handler comprises software providing signal handling functions common for all types of ISDN signaling protocols.

30. The method of claim 27, wherein the signal type indicates an action requested by the signal.

31. The method of claim 27, wherein the signal type indicates a selected one of alerting, call proceeding, connect, connect acknowledge, setup, setup acknowledge, suspend, suspend acknowledge, suspend reject, resume, resume acknowledge, resume reject, disconnect, release, release complete, status inquiry, and status.

32. The method of claim 27, wherein the resource information indicates a required protocol module and a current state for each of the telephony resources.

33. The method of claim 27, wherein the selected protocol module comprises a state table indicating a plurality of actions indexed by signal types and resource states.

34. The method of claim 33, wherein processing the signal comprises:
accessing the state table to determine an action based on the signal type and the current state;
performing the action; and
updating the current state of the one telephony resource.

35. Software for processing a telephony signal, the software embodied in a computer readable medium and operable to:
maintain a local protocol database comprising a plurality of protocol modules;
identify, for each of a plurality of telephony resources, a protocol module required to process signals received by the telephony resource;
determine, for each of the identified protocol modules, whether the identified protocol module is valid in the local protocol database;
request each of the protocol modules not determined valid from a remote protocol database;
receive the requested protocol modules from the remote protocol database;
store the requested protocol modules in the local protocol database;
receive a signal from one of the telephony resources;
determine a signal type for the signal using a core signal handler;
access resource information associated with the one telephony resource to determine a current state of the one telephony resource;
select one of the protocol modules for processing the signal;
process the signal using the selected protocol module based on the signal type and the current state; and
handle parallel signaling for each of the telephony resources using the protocol module required for that one of the telephony resources.

36. The software of claim 35, wherein the signal comprises an integrated services digital network (ISDN) signal.

37. The software of claim 35, wherein the core signal handler comprises software providing signal handling functions common for all types of ISDN signaling protocols.

38. The software of claim 35, wherein the signal type indicates an action requested by the signal.

39. The software of claim 35, wherein the signal type indicates a selected one of alerting, call proceeding, connect, connect acknowledge, setup, setup acknowledge, suspend, suspend acknowledge, suspend reject, resume, resume acknowledge, resume reject, disconnect, release, release complete, status enquiry, and status.

40. The software of claim 35, wherein the resource information indicates a required protocol module and a current state for each of the telephony resources.

41. The software of claim 35, wherein the selected protocol module comprises a state table indicating a plurality of actions indexed by signal types and resource states.

42. The software of claim 41, wherein processing the signal comprises:
accessing the state table to determine an action based on the signal type and the current state;
performing the action; and
updating the current state of the one telephony resource.

43. Software for configuring a telecommunications device, the software embodied in a computer readable medium and operable to:
maintain a local protocol database comprising a plurality of protocol modules;
identify, for each of a plurality of telephony resources, a protocol module required to process signals received by the telephony resource;
determine, for each of the identified protocol modules, whether the identified protocol module is valid in the protocol database;
request each of the protocol modules not determined valid from a remote protocol database;
receive the requested protocol modules from the remote protocol database;
store the requested protocol modules in the local protocol database; and
handle parallel signaling for each of the telephony resources using the protocol module required for that one of the telephony resources.

44. The software of claim 43, wherein each of the protocol modules comprises a state table indicating responses to integrated services digital network (ISDN) signals.

45. The software of claim 43, wherein each of the protocol modules comprises a state table indicating responses to signals based on a signal type and a current state of the telephony resource associated with the protocol module.

46. The software of claim 43, wherein the local protocol database stores a plurality of protocol modules, each protocol module corresponding to one of the telephony resources.

47. The software of claim 43, further operable, for each telephony resource, to process signals received by the telephony resource using a core signal handler to access the required protocol based on signal type of a signal received by the telephony resource and a current state of the telephony resource.

48. The software of claim 43, wherein the remote protocol database stores a plurality of master protocol modules that may be requested by the telecommunications device.

49. A communications device for supporting communications using a plurality of integrated services digital network (ISDN) protocols, comprising:
- means for maintaining a local protocol database comprising a plurality of protocol modules;
- means for identifying, for each of a plurality of telephony resources, a protocol module required to process signals received by the telephony resource;
- means for determining, for each of the identified protocol modules, whether the identified protocol module is valid in the local protocol database;
- means for requesting each of the protocol modules not determined valid from a remote protocol database;
- means for receiving the requested protocol modules;
- means for storing the requested protocol modules in the local protocol database; and
- means for handling parallel signaling for each of the telephony resources using the protocol module required for that one of the telephony resources.

50. The communications device of claim 49, wherein each of the protocol modules comprises a state table indicating responses to integrated services digital network (ISDN) signals.

51. The communications device of claim 49, wherein each of the protocol modules comprises a state table indicating responses to signals based on a signal type and a current state of the telephony resource associated with the protocol module.

52. The communications device of claim 49, wherein the local protocol database stores a plurality of protocol modules, each protocol module corresponding to one of the telephony resources.

53. The communications device of claim 49, wherein the remote protocol database stores a plurality of master protocol modules that may be requested by the communications device.

* * * * *